US006638589B1

United States Patent
Järvenkylä

(10) Patent No.: US 6,638,589 B1
(45) Date of Patent: Oct. 28, 2003

(54) METHOD AND APPARATUS FOR USING RECYCLED PLASTIC MATERIAL, AND A PLASTIC PRODUCT MADE BY AN EXTRUDER

(75) Inventor: Jyri Järvenkylä, Hollola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 08/982,144

(22) Filed: Dec. 1, 1997

(30) Foreign Application Priority Data

Dec. 12, 1996 (FI) .................................................. 964991

(51) Int. Cl.$^7$ .............................. B32B 1/08; B32B 5/16; B32B 27/32
(52) U.S. Cl. .................... 428/36.9; 428/36.92; 428/327; 428/523; 428/903.3; 521/47; 525/225; 525/226; 525/240
(58) Field of Search .............................. 428/327, 903.3, 428/36.9, 36.92, 523; 521/47; 525/240, 225, 226

(56) References Cited

U.S. PATENT DOCUMENTS

| | | | |
|---|---|---|---|
| 3,954,537 A | | 5/1976 | Alfter et al. ................... 156/82 |
| 4,056,421 A | * | 11/1977 | Jarvis .......................... 156/272 |
| 4,123,584 A | | 10/1978 | Brewton ...................... 428/379 |
| 4,628,073 A | * | 12/1986 | Fisher .......................... 525/70 |
| 4,692,495 A | * | 9/1987 | Van Der Vegt ............. 525/184 |

FOREIGN PATENT DOCUMENTS

| | | |
|---|---|---|
| DE | 2328964 | 1/1975 |
| DE | 1950351 | 5/1996 |
| JP | 59-83886 A * | 5/1984 |

OTHER PUBLICATIONS

Alger, M., Polymer Science Dictionary, 2$^{nd}$ Edition, p. 378, Apr. 1999.*
Encyclopedia of Polymer Science and Engineering, vol. 6, p. 420, Jun. 1987.*
English translation of German patent DE 195 03 516 C1, May 1996.*
Derwent file 1984–156198, abstact of JP 59–83886 A, 1984.*

* cited by examiner

*Primary Examiner*—Ramsey Zacharia
(74) *Attorney, Agent, or Firm*—Ladas & Parry

(57) ABSTRACT

The invention relates to a method and apparatus for using recycled plastic material, and to a plastic product produced by an extruder. In the invention, crosslinked polyethylene is ground to powder form and mixed with e.g. polyethylene so that the proportion of the crosslinked polyethylene in the mixture is less than 30%. The mixture is supplied through an extruder (2) for making an extruded plastic product. In this way, crosslinked polyethylene can be recycled in a cost-effective and simple manner, while producing a plastic product that contains recycled crosslinked polyethylene.

10 Claims, 1 Drawing Sheet

METHOD AND APPARATUS FOR USING RECYCLED PLASTIC MATERIAL, AND A PLASTIC PRODUCT MADE BY AN EXTRUDER

FIELD OF THE INVENTION

The invention relates to a method of using recycled plastic material, in which method crosslinked polyethylene is mixed with the base material, e.g. polyolefin, of the product to be produced, in such a way that the proportion of the recycled crosslinked polyethylene in the mixture is less than 30%, and the mixture is supplied through an extruder.

The invention also relates to apparatus for using recycled plastic material, the apparatus comprising a grinder for pre-processing the recycled material and an extruder for making an extruded product from the mixture of base material, such as polyolefin, and crosslinked polyethylene.

The invention also relates to a plastic product made by the extruder, the product primarily comprising base material, such as polyolefin, and less than 30% of recycled crosslinked polyethylene.

BACKGROUND OF THE INVENTION

Recycling of plastics waste is often rather difficult, and the use of recycled crosslinked polyethylene for making plastic products is particularly difficult, since crosslinked polyethylene cannot be re-melted by standard methods. German Offenlegungsschrift 19 503 519 discloses a method in which a maximum of 25% by weight of crosslinked polyethylene is mixed with other plastic material and supplied to an extruder, in which the mixture is subjected to an elevated temperature of above 400° C., after which the mixture is mixed in a mixer and a plastic product is produced by the extruder. The method concerned is complicated and requires apparatus in which the temperature of the mixture can be raised very high, whereby the method and apparatus become complicated and expensive to implement.

BRIEF SUMMARY OF THE INVENTION

The object of the invention is to provide a method and apparatus by which crosslinked polyethylene can be re-used in a fairly cost-effective and simple manner and a very good product can be produced from the recycled crosslinked polyethylene.

The method of the invention is characterized by grinding the crosslinked polyethylene to powder form before it is supplied to the extruder.

Further, the apparatus of the invention is characterized in that the grinder comprises at least one stator and at least one rotatable rotor whose surfaces placed against each other are arranged to define a conical feed gap between them, the rotor and the stator having grooves for grinding the grindable material and for discharging it from the grinder.

The plastic product according to the invention is also characterized in that the crosslinked polyethylene is powder that is mixed with the base material.

The essential idea of the invention is that the crosslinked polyethylene is ground to powder form and mixed with polyolefin so that the proportion of crosslinked polyethylene in the mixture is less than 30% by weight and that the mixture is supplied through the extruder to produce an extruded plastic product. The idea of a preferred embodiment is that the crosslinked polyethylene is ground by grating and tearing so that the powder orientates. The idea of another preferred embodiment is that a conical grater is used for the grinding.

The advantage of the invention is that it enables cost-effective and simple recycling of crosslinked polyethylene, while providing a product that contains recycled crosslinked polyethylene. By grinding the crosslinked polyethylene at a low temperature by grating and tearing, such ground crosslinked polyethylene is obtained that is contained in a product whose tensile strength and elastic modulus are, surprisingly, very good. The use of standard filling agents typically improves the elastic modulus. Instead, the improvement in the tensile strength is particularly surprising and may be caused by the fact that the grating and tearing of the material at a low temperature in fact orientate a crosslinked particle so that its strength continues to grow to some extent and will not disappear completely during the extrusion step that follows. The use of a conical grater for the grinding is advantageous, for example, because the clearance is easy to adjust in it, and this has a decisive influence on the capacity and particle size distribution. The essential feature, however, is that the grindable pieces can be compressed to a high pressure in the conical or partly conical grinder, while the shape of the cross-section of the groove in the screw is maintained unchanged. The heat due to friction generated in this way can be reduced and the consumption of energy thereby decreased.

BRIEF DESCRIPTION OF THE DRAWINGS

The invention will be described in greater detail in the accompanying drawing, in which.

DETAILED DESCRIPTION

Figure 1:
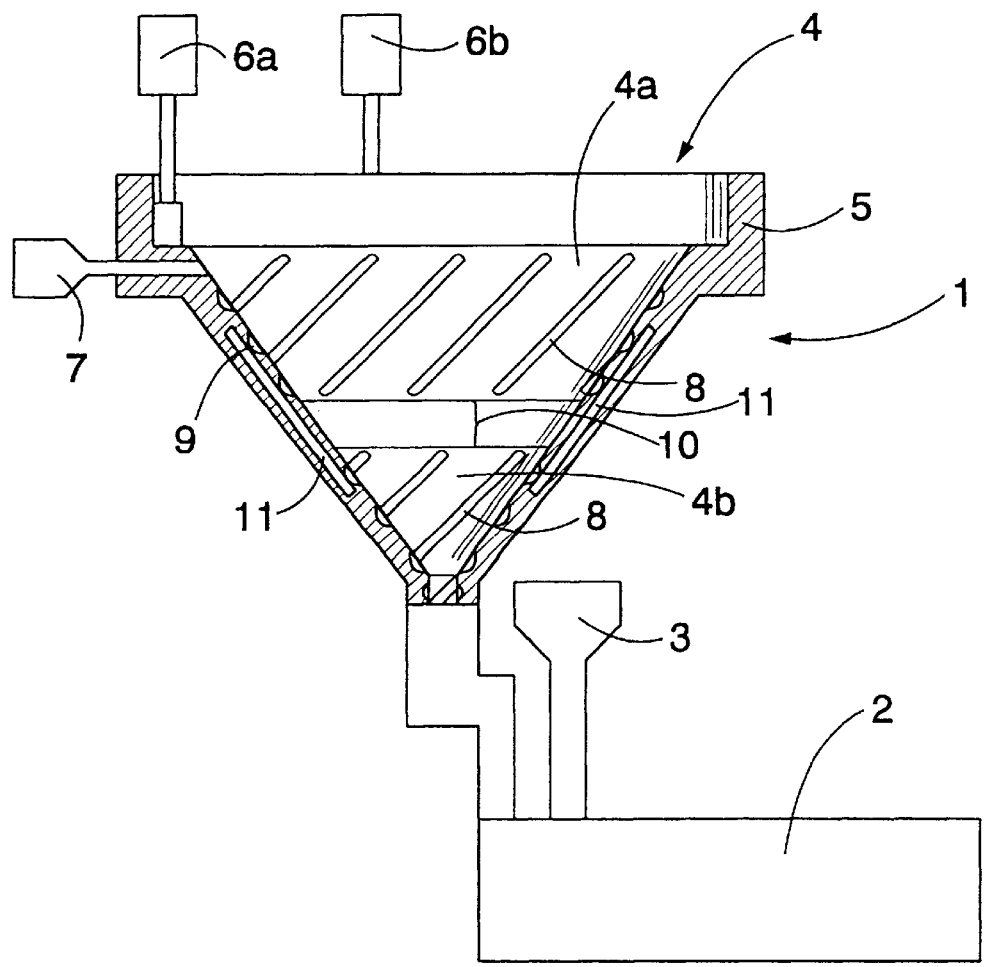
FIG. 1 shows a schematic, partly cross-sectional side view of apparatus according to the invention.

FIG. 1 shows apparatus for reprocessing crosslinked polyethylene. The apparatus comprises a grinder 1 for grinding the crosslinked polyethylene, the powder being supplied from the grinder 1 to an extruder 2. In addition to the powder provided by the grinder 1, polyolefin, such as polyethylene particles or powder, is also supplied to the extruder 2 by a feed device, the polyolefin forming the main part of the product to be extruded. The matrix plastics may also comprise polyethylene with crosslinking agent, whereby the final product can be crosslinked either in the extruder or in a heat treatment that follows (not shown), e.g. in the manner shown in our application PCT/EP96/02801. A mixture of the powder provided by the grinder 1 and the plastic material fed by the feed device 3 is extruded by the extruder 2 to provide an extruded plastic product. The extruder 2 can be, for example, an extrusion machine or an injection machine, and as regards the structure, it may in principle be any extruder known per se. Preferably, the extruder is a cone press of the type described in our application FI 961,822, since a good mixing efficiency is achieved with it. The temperature of the mixture in the extruder 2 may be less than 300° C., even less than 250° C. The extruded product may be, for example, a pipe, a film, a cable sheath, or some other plastic product. Most preferably, the product is, for example, a multi-layer product according to our application FI 955,960, whereby a layer containing recycled material can be placed, well protected, between protective layers containing new plastics. The grinder 1 and the extruder 2 can be fully integrated cones placed one within the other, as is usual e.g. in multirotor extruders. One of the cones then operates as a grinder at a low temperature, typically below 100° C., and the discharged crosslinked polyethylene powder is supplied onto the surface of the other cone together with the matrix plastics, and the latter cone operates as a standard cone extruder at temperatures that are higher than the melting point of the matrix plastics. In addition to compact structure, another advantage of the arrangement is that the thermal energy contained in the heated, crosslinked polyethylene powder will not be lost on the way. The grinder 1 and the extruder 2 can also be physically spaced from each other. The powder provided by the grinder 1 can then be first mixed with other plastic material and the mixture then fed by the feed device 3 into the extruder 2. Together with the crosslinked polyethylene, e.g. some other polymeric waste or mineral filler can be fed into the grinder 1.

Most of the mixture fed into the extruder 2 is standard, easily moldable plastic material, such as polyethylene, and powder is supplied from the grinder 1 to the mixture so that the proportion of ground crosslinked polyethylene provided by the grinder 1 is less than 30% by weight in the mixture, preferably less than 15% by weight, most preferably about 10% by weight. This makes it possible to grind crosslinked polyethylene (PEX) by the grinder 1 and to form an extruded product from the mixture fed into the extruder 2, without that the extruder 2 should have a structure that would raise the temperature of the mixture above the normal working temperature of extrusion apparatus, i.e. the extruder 2 can even have a very simple structure. In the extruder 2, the mixture mixes sufficiently, and the crosslinked polyethylene powder mixed with the base material, such as polyethylene, will not impair the final product, even though it does not melt. On the contrary, as the crosslinked polyethylene powder is provided by the grinder by grating and tearing, the powder can be orientated, whereby the powder concerned has a strengthening effect on the final product. The tests conducted have shown that when about 10% of the crosslinked polyethylene ground in the above manner is mixed with polyethylene, the tensile strength and elastic modulus of the final product are about 25% higher than those of a product made e.g. from standard polyethylene. The mechanism underlying this surprising improvement in the characteristics is not fully known, but it seems obvious that contrary to expectations, polyolefin welds with PEX on the very surface, and the PEX—since it has been ground by tearing—has a slight orientation that will not fully disappear even later during melt processing. The less the mixture contains crosslinked polyethylene powder, the easier the final product is to make. When the proportion of the crosslinked polyethylene is about 10%, the final product is relatively easy to make, and yet quite a lot of crosslinked polyethylene, which is otherwise very difficult to recycle, can be used in the process.

Most preferably, the grinding is conducted by a grinder 1 comprising a rotatable rotor 4 with a stator 5 arranged against a surface thereof so that the rotor 4 and the stator 5 define a conical feed gap between them. Since the feed gap is conical, its clearance is very easy and simple to adjust by moving the stator and/or rotor in the axial direction. The adjustment of the clearance may take place during the process or, if desired, even continuously, whereby it may vary e.g. in accordance with a sine wave. The rotor 4 is rotated by a rotating means 6a in a manner known per se. The grindable material is fed by a supply device 7 into the feed gap between the rotor 4 and the stator 5. The grinder 1 can contain various alternative feed openings for feeding recycled chips with different densities, whereby the position of the supply device 7 can be easily changed or a plural number of supply devices 7 can be used. When the rotor 4 rotates in the direction of arrow A, grooves 8 in the rotor 4 convey the grindable material downward in the figure toward the nozzle of the grinder 1, simultaneously grinding and grating the grindable material. The stator 5 can also be provided with grooves 9 for grinding the grindable material and for moving it toward the nozzle of the grinder 1. Preferably, an area 10 without grooves can be arranged in the middle section of the rotor 4 and in the middle section of the stator 5 as well, the grindable material being subjected to pressure in the area as it moves forward in the grinder 1. This improves the grating and thereby orientating effect of the grinder 1. The grooves 8 of the rotor 8 and the grooves 9 of the stator 5 can be arranged to cross after the grooveless area 10 in the vicinity of the nozzle of the grinder 1, whereby the shearing and tearing effect of the grinder 1 is further improved. The rotor 4 can be divided into parts in the axial direction so that the broader part, i.e. a feed rotor 4a, can be rotated by a rotating means 6a, whereby the area of the feed rotor 4a forms the feed area of the grinder 1; and a grinding rotor 4b in the vicinity of the nozzle, in turn, can be rotated by a second rotating means 6b, whereby the area of the grinding rotor 4b forms the grinding area of the grinder 1. The speed of rotation of the feed rotor 4a and/or the grinding rotor 4b may be separately adjustable so that the yield and grinding effect of the grinder can be adjusted as desired. The grooveless area 10 can be provided between the feed rotor 4a and the grinding rotor 4b, whereby the grindable material will wait in the area, under pressure, for access to the grinding area. The grinder 1 further comprises cooling means 11 with which the temperature of the grinder and of the material to be ground therein can be maintained lower than the melting point of the grindable material, whereby the grinder 1 grinds the material effectively and essentially without melting it. The grindable crosslinked polyethylene can be supplied by the supply device 7, for example as pieces with a diameter of 5 to 30 mm, to the grinder 1, the powder produced by the grinder 1 having a grain size of less than 1 mm. The grinder 1 can be partly or entirely conical. It is thus characteristic of the grinder that the diameter of the feed point is greater than the diameter of the outlet and that the shape of the grooves 8 or 9 does not change in the conical section. In other words, the pressure-raising capacity of the screw is based solely on the difference in the circumferential speeds. The advantage achieved is that the feed point of the recycled plastic chips supplied to the cone and having a particle size of typically 5 to 30 mm can easily vary. For example, if the waste has a low bulk density, the chips are supplied to the outermost circumference, and if the bulk density is higher, the chips can be supplied to an area that is closer to the actual grinding rotor. This solution provides a many-sided grinder 1 whose grinding characteristics are maintained constant regardless of variation in the characteristics of the material fed.

Figure 2:
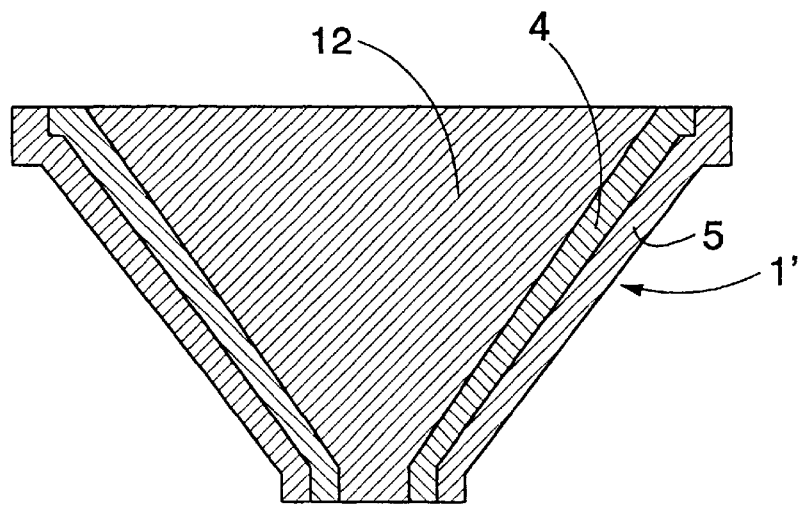
FIG. 2 shows a schematic cross-sectional side view of another embodiment of a grinder of the apparatus according to FIG. 1.

FIG. 2 shows another grinder 1'. The numbering in FIG. 2 corresponds to the numbering used in FIG. 1. For the sake of clarity, neither rotating means, supply devices nor grooves are shown in FIG. 2. The grinder 1' comprises a conical inner stator 12 arranged on the inside of the rotor 4. The grinder 1' thus comprises two conical feed gaps. A grinder like this enables very effective grinding of the grindable material.

The drawing and the description thereof are only intended to illustrate the idea of the invention. The invention can thus vary in its details within the scope of the claims. For example, the grinder 1 may comprise a plural number of rotors and/or stators. Also, if desired, the rotor can be arranged e.g. in FIG. 1 outside the stator. Further, the stator or stators can be arranged to be rotated and the rotor and stator can then rotate either in the same direction or in different directions.

What is claimed is:

1. A product produced by an extruder, the product primarily comprising a plastic base material, and less than 30% by weight of recycled crosslinked polyethylene plastic, the recycled crosslinked polyethylene plastic being powder mixed with the base material and bonded to the base material at its surface and orientated by grating and tearing, whereby the tensile strength of the product is greater than the tensile strength of a product made from the base material alone, the recycled cross-linked polyethylene powder being such that it does not melt when extruded with the base material under conditions at which the powder bonds to the base material at a surface thereof to form an extruded mixture with said greater tensile strength, said product being a plastic pipe.

2. A plastic product according to claim 1, wherein the proportion of recycled crosslinked polyethylene is about 10%.

3. A product comprising an extruded mixture of a plastic base material and a recycled cross-linked polyethylene plastic in powder form bonded to the base material at a surface thereof, said base material comprising a main part of said extruded mixture, said recycled cross-linked polyethylene powder having an orientation and being present in the extruded mixture in an amount such that the product has a tensile strength that is greater than the tensile strength of the product without the powder, said recycled cross-linked powder being such that it does not melt when extruded with the base material under conditions at which the recycled cross-linked polyethylene powder bonds to the base material at the surface thereof to form the product with the tensile strength that is greater than the tensile strength of the product without the powder, said product being a plastic pipe.

4. A product according to claim 3, wherein the recycled cross-linked polyethylene powder is present in the extruded mixture in an amount of less than 20% by weight.

5. A product according to claim 3, wherein the base material is polyethylene and the recycled cross-linked polyethylene powder is present in the extruded mixture in an amount such that the product has a tensile strength and elastic modulus that are about 25% higher than those of the product when made without the recycled cross-linked polyethylene powder.

6. A product according to claim 3, wherein the product is produced by coextrusion of the recycled cross-linked polyethylene powder and the base material in an extruder, the recycled cross-linked polyethylene powder having said orientation prior to said coextrusion.

7. A product according to claim 6, wherein the recycled cross-linked polyethylene powder is fed into the extruder with a grain size of less than 1 mm.

8. A product according to claim 7, wherein the base material is a polyolefin.

9. A product according to claim 3, wherein the base material is polyethylene.

10. A plastic pipe produced by a process consisting essentially of
    (a) grinding a recycled crosslinked polyethylene plastic material by grating and tearing to form a powder having an orientation, the ground powder being such that it does not melt when extruded with a plastic base material under conditions at which the powder bonds to the base material at a surface thereof to form a product with a tensile strength that is greater than the tensile strength of the product without the powder;
    (b) mixing the ground powder formed in step (a) with a base material comprising a plastic polyolefin to form a mixture with the ground powder; and
    (c) extruding the mixture to form the plastic pipe at a temperature below 300° C. at which the powder (i) does not melt; (ii) bonds to the base material at a surface thereof; and (iii) maintains the orientation, said ground powder being present in the extruded mixture in an amount such that the product has a tensile strength that is greater than the strength of the product without the powder.

* * * * *